(12) United States Patent
Brown et al.

(10) Patent No.: US 9,692,702 B1
(45) Date of Patent: Jun. 27, 2017

(54) AUTOMATED THROTTLING OF WEBSITE POLLING

(71) Applicant: Amazon Technologies, Inc., Seattle, WA (US)

(72) Inventors: Aaron Michael Brown, Seattle, WA (US); Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 14/571,123

(22) Filed: Dec. 15, 2014

(51) Int. Cl.
*G06F 15/16* (2006.01)
*H04L 12/801* (2013.01)

(52) U.S. Cl.
CPC .................... *H04L 47/12* (2013.01)

(58) Field of Classification Search
CPC ....................................................... H04L 47/12
USPC ........................................................ 709/235
See application file for complete search history.

(56) References Cited

U.S. PATENT DOCUMENTS

| | | | | |
|---|---|---|---|---|
| 7,620,697 B1* | 11/2009 | Davies | ............... | G06F 17/3089 709/217 |
| 2004/0267878 A1* | 12/2004 | Osias | ............... | G06Q 20/40 709/203 |
| 2010/0251350 A1* | 9/2010 | Choi | ............... | G06F 8/65 726/7 |
| 2011/0296050 A1* | 12/2011 | Cherukuri | ............... | H04L 67/02 709/232 |
| 2012/0180021 A1* | 7/2012 | Byrd | ............... | G06F 21/604 717/100 |

* cited by examiner

*Primary Examiner* — Glenford Madamba
(74) *Attorney, Agent, or Firm* — Klarquist Sparkman, LLP (57) ABSTRACT

Techniques and solutions are described for throttling automated polling requests. For example, an automated polling request that is generated by a web page can be received and a decision can be made to throttle, or not throttle, the automated polling request. The decision can be made based on comparison of the automated polling request with previous automated polling requests (e.g., during a throttling time period). For example, repetitive automated polling requests that occur during a throttling time period can be throttled.

19 Claims, 8 Drawing Sheets

AUTOMATED THROTTLING OF WEBSITE POLLING

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

The content of a web page that is retrieved and displayed can be updated. For example, a web page may contain content areas that can be refreshed with new content, such as new text, images, videos, etc. In order to refresh content on a web page, the web page can generate a request to a web server to check, or poll, for new content. Such polling requests can be performed on a periodic basis.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

The following description is directed to techniques and solutions for automated throttling of web site polling. For example, a computing device running a web browser application can download a web page from a web site. The web browser application can render and display the downloaded web page. The web page can contain instructions (e.g., JavaScript or other code) to send requests on a scheduled basis (e.g., every 30 seconds) to a web server to check for content updates or for another purpose (e.g., to report metrics). Such requests that are automatically sent on a scheduled basis can increase use of computing resources. For example, on a battery-powered computing device, such as a mobile phone or tablet, such automated requests can negatively affect battery life by increasing processor utilization and increasing wireless network utilization (e.g., waking up, or keeping on, the cellular or WiFi radio to transmit the automated requests). Such automated requests can also result in increased network bandwidth utilization. By throttling such automated polling requests (e.g., automated requests that are repetitive), computing resources can be saved (e.g., battery power and network bandwidth).

Some web pages perform automated polling activity. For example, a web page (e.g., downloaded and displayed within a web browser application) can include code (e.g., JavaScript, Ajax, etc.) that sends automated polling requests to a web site. For example, the automated requests can be sent on a periodic basis (e.g., every 15 seconds, every minute, etc.). The automated requests can be used to check for updated web page content (e.g., updated news stories, updated advertisements, etc.), to report statistics, or for other purposes. Automated polling requests can be throttled by a web browser component (e.g., a plug-in), by a network layer component (e.g., a network driver), or by another software and/or hardware component of the computing device. Throttling of automated polling requests can be performed automatically (e.g., when the automated polling requests are considered excessive or repetitive).

Automated polling requests are requests that are generated by a web page (e.g., by code, scripts, downloadable controls or applets, or other components of the web page). Automated polling requests are generated automatically without being user initiated. In some instances, automated polling requests are generated on a periodic basis (e.g., every 30 seconds, every 5 minutes, or on some other scheduled basis) by the web page.

Automated polling requests are requests that are directed to an external server via a network (e.g., directed to a web server via the Internet). In some instances, an automated polling request is a request for updated web content. For example, a web page that contains current news articles can periodically poll a web server to check for new news stories, and if new stories are available download and display them.

For example, a user can enter a URL for a news web site to view local news stories (e.g., a URL such as http://www.mynewssite.com/). On a periodic basis, the web page obtained from the news web site may generate automated polling requests to check for new articles. A simplified example of an automated polling request is presented below (e.g., for checking for new local news stories for a client device or user located in Seattle, Wash.):

http://www.mynewssite.com/content?location=Seattle_WA

Throttling an automated polling request refers to blocking the request (e.g., deleting, removing, canceling, or otherwise not sending the request to its destination web site) or delaying the request until a later time (e.g., not sending the request to its destination web site during a current throttling time period, and instead, in some embodiments, batching the request for sending later). For example, a web browser component or networking component can receive an automated polling request generated by a web page running within a web browser application and throttle the request (e.g., if it is determined that the automated polling request is repetitive).

In some implementations, throttling of automated polling requests uses a throttling time period. A throttling time period is a period of time within which throttling occurs, with throttling activity being reset when a new throttling time period begins. For example, when a new throttling time period begins (e.g., a 1 minute throttling time period), a certain number of automated polling requests may be allowed (e.g., one request, three requests, or some other pre-defined or user-configured number of requests). If additional automated polling requests are received during the throttling time period, then they are throttled. For example, if only one automated polling request is allowed during a 30-second throttling time period, then any automated polling requests received during the 30-second throttling time period, after the first, will be throttled.

In some implementations, a user can initiate a polling request. For example, a user viewing a news web page may select a refresh button to initiate a polling request for updated news stories. Such a user-initiated polling request can be permitted because it is not an automated polling request (i.e., it is not initiated by an automated web page process, and instead is initiated by the user). In some implementations, a user-initiated polling request resets the throttling time period. For example, a user-initiated polling request that occurs 25 seconds into a 1-minute throttling time period can restart the time period (e.g., start a new 1-minute throttling time period following the user-initiated polling request) or clear any pervious automated throttling requests during the throttling time period (e.g., permitting another automated polling request during the remainder of the 1-minute throttling time period). In some implementations, a user-initiated polling request does not affect throttling activity. In some implementations, after a web page is loaded a threshold number of automated polling requests are permitted (and subsequent automated polling requests are throttled) until a user takes some action (e.g., refreshes the page, clicks on a link, enters a new URL, etc.).

Information controlling throttling of automated polling requests can be defined by (or stored in) a throttling profile. For example, a throttling profile can define a throttling time period (e.g., a time period, such as 30 seconds or 5 minutes, during which only a pre-defined number of automated polling requests, such as one or two, will be permitted). In some implementations, a throttling profile comprises a number of throttling rules (e.g., rules defining throttling time periods, rules defining a threshold number of automated throttling requests permitted during a throttling time period, etc.). In some implementations, a throttling policy controls throttling activity for each of a number of web pages and/or web sites. For example, a throttling policy can define different throttling activity for different web sites, such as for first web site that has a throttling time period of 5 minutes and a second web site that has a throttling time period of 1 minute. A throttling policy can also define throttling rules based on domain names (e.g., a single domain name or a group of domain names) and/or IP ranges (e.g., subnets or other ranges of IP addresses).

Figure 1:
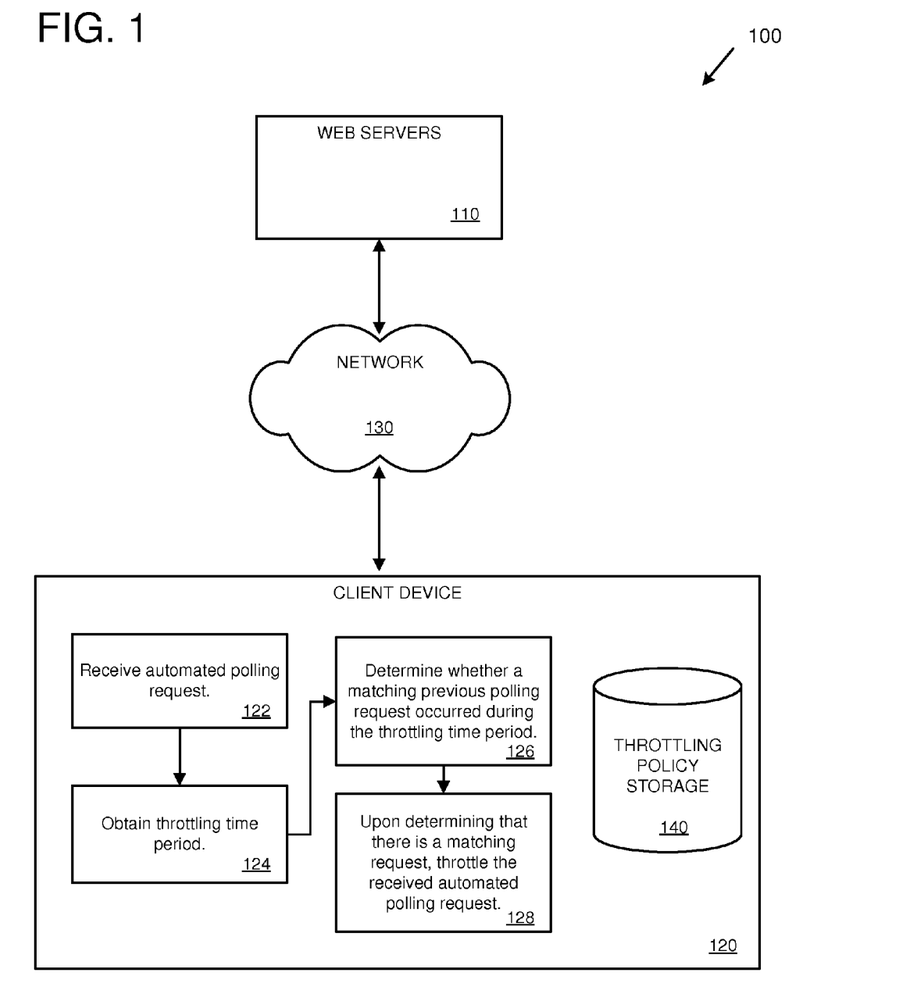
FIG. 1 is a block diagram depicting an example environment in which repetitive automated polling requests can be throttled.

FIG. 1 is a block diagram of an example environment 100 in which automated polling requests can be throttled (e.g., repetitive automated polling requests). The example environment 100 includes web servers 110 (e.g., various types of server computers providing web content, which can include original content servers, caching servers, and/or other types of servers that provide web pages and associated resources).

The web servers 110 host web sites and provide web content to client devices running web browser applications, including client device 120, via the network 130.

The client device 120 accesses and displays web pages from web sites hosted by the web servers 110. The web pages retrieved and displayed by the client device 120 may generate automated polling requests for sending to the web servers 110 (e.g., to check for updated content). These automated polling requests can be detected by the computing device 120 (e.g., by a web browser component, such as a browser extension or plug-in, by a network component, such as network stack or network driver, and/or by other software and/or hardware of the client device 120).

In some implementations, the client device 120 receives an automated polling request, as depicted at 122, generated by a web page running within a web browser application of the client device 120. The automated polling request can be received by a web browser plug-in, by a network driver, or by another component of the client device 120. The client device 120 obtains a throttling time period, as depicted at 124. For example, the client device 120 can obtain the throttling time period from throttling policy storage 140 (e.g., a local store of throttling policies) and/or from another location (e.g., from an external server). The client device 120 then determines whether there was a previous polling request (e.g., that was permitted) during the throttling time period that matches the received automated polling request, as depicted at 126. Upon determining that there is a matching request during the throttling time period, the received automated polling request is throttled, as depicted at 128. For example, a browser component or network driver receiving the automated polling request can block or otherwise not sent the received automated polling request to a destination web server (e.g., one of the web servers 110). Therefore, in the implementation depicted in operations 122 through 128, only one automated polling request is permitted per throttling time period. In other implementations, different throttling policies can be applied to allow more automated polling requests and/or to make throttling decisions based on other criteria.

The depicted operations 122 through 128 can be performed by various software and/or hardware components of the client device 120. For example, the operations can be performed by a web browser component (e.g., an extension or plug-in), by a network layer component (e.g., by a network driver), by an operating system component, and/or by other components of the client device 120.

Figure 2:
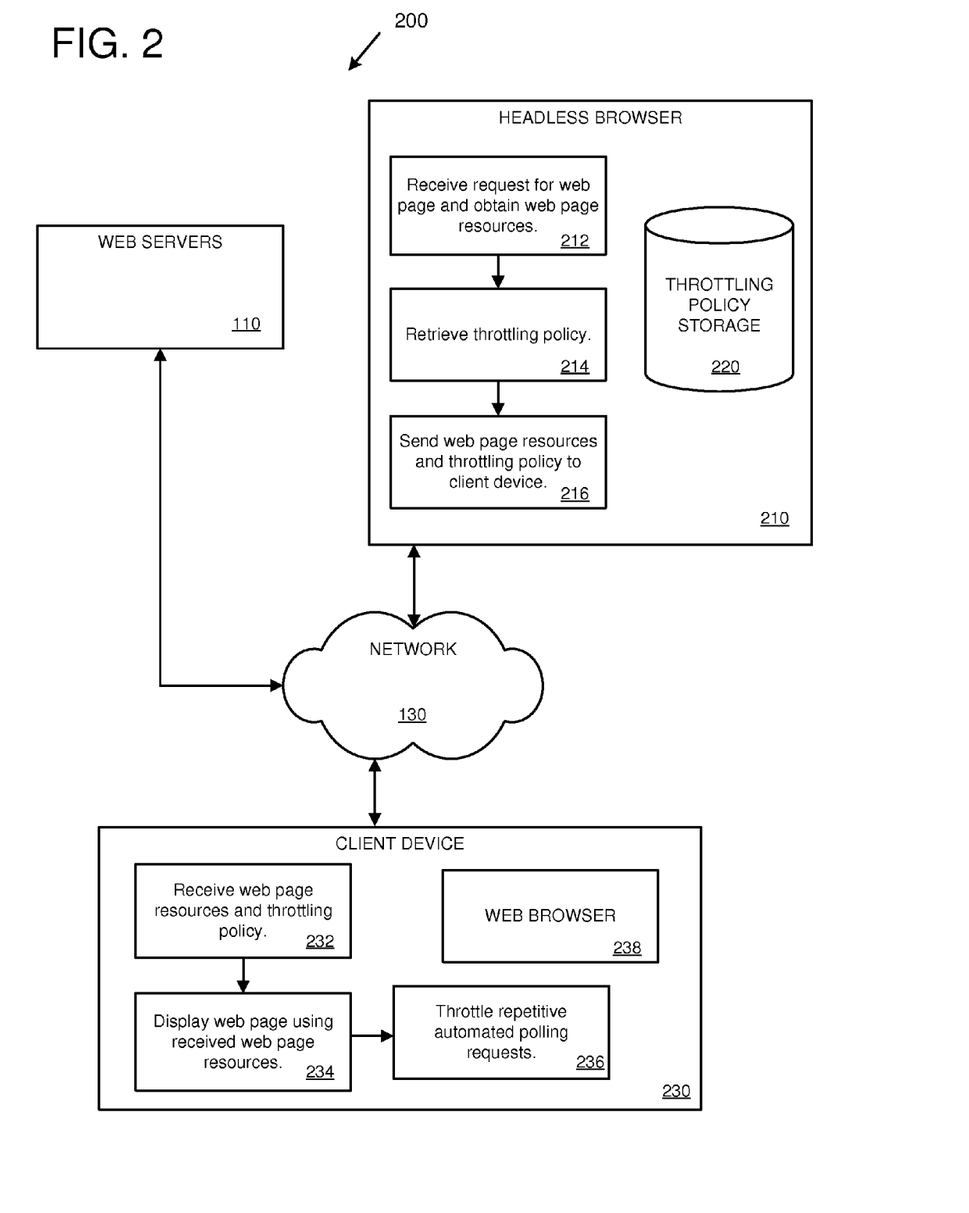
FIG. 2 is a block diagram depicting an example environment including a headless browser in which repetitive automated polling requests can be throttled.

FIG. 2 is a block diagram of an example environment 200 in which repetitive automated polling requests can be throttled. The example environment 200 includes a headless browser environment 210. The headless browser environment 210 can comprise various types of computing devices (e.g., server computers, databases, networking devices, etc.) that provide the headless browser environment 210 (e.g., as a centralized service or as a distributed, or cloud-based, service). The headless browser environment 210 supports web browsing activity of client devices, such as client device 230 connected via network 130. For example, the headless browser environment 210 can receive a request for a web page from the client device 230 (e.g., via a web browser application 238 running on the client device 230). In response, the headless browser environment 210 can retrieve web page resources (e.g., HTML, JavaScript, CSS information, images, and/or other web page resources) from web servers 110. The headless browser environment 210 can provide the web page resources to the client device 230 in their original state (e.g., original HTML and related resources) and/or in a processed state. For example, the headless browser environment 210 can process the web page resources (e.g., create a Document Object Model (DOM), create processed layers, or create bitmap images) and send the processed resources to the client device 230. The client device 230 can received the web page resources, perform local processing if needed, and display the web page within the web browser application 238.

The headless browser environment 210 can participate in throttling of automated polling requests. For example, the headless browser environment 210 can store throttling policies in throttling policy storage 220 (e.g., throttling policies that are web site and/or web page specific). The headless browser environment 210 can obtain a throttling policy for a web page requested by the client device 230 and send the throttling policy to the client device 230 for use in throttling automated polling requests.

The headless browser environment 210 can also send other information or instructions to the client device 230. For example, the headless browser environment 210 can decide whether requests for a particular web page or web site should be throttled and send corresponding instructions to the client device 230. In some implementations, the headless browser environment 210 monitors browsing activity by multiple users to generate aggregated statistics related to automated polling, such as how often content is updated, how often automated polling requests are sent, which types of automated polling requests are sent (e.g., URL and/or HTTP header field information), etc. The headless browser environment 210 can store aggregated and anonymized statistics, which can be used to create throttling profiles (e.g., to set throttling time periods to correspond to expected content change intervals) for providing to client devices that utilize the headless browser environment 210.

In some implementations, the headless browser environment 210 receives a request for a web page from client device 230 and obtains web page resources for the requested web page, as depicted at 212. The headless browser environment 210 retrieves a throttling policy from throttling policy storage 220, as depicted at 214. For example, the throttling policy can be specific to a web site serving the requested web page. The headless browser environment 210 sends the web page resources (e.g., after performing processing operations) and the throttling policy to the client device 230, as depicted at 216.

In some implementations, the client device 230 receives web page resources for a requested web page and a throttling policy from the headless browser environment 210, as depicted at 232. The client device 230 displays the web page using the received web page resources within the web browser application 238, as depicted at 234. The client device 230 receives automated polling requests generated by the web page and throttles them (e.g., if they are repetitive). For example, the client device 230 can throttle automated polling requests, other that the first automated polling request, that occurs during a throttling time period as defined by the received throttling policy.

Figure 3:
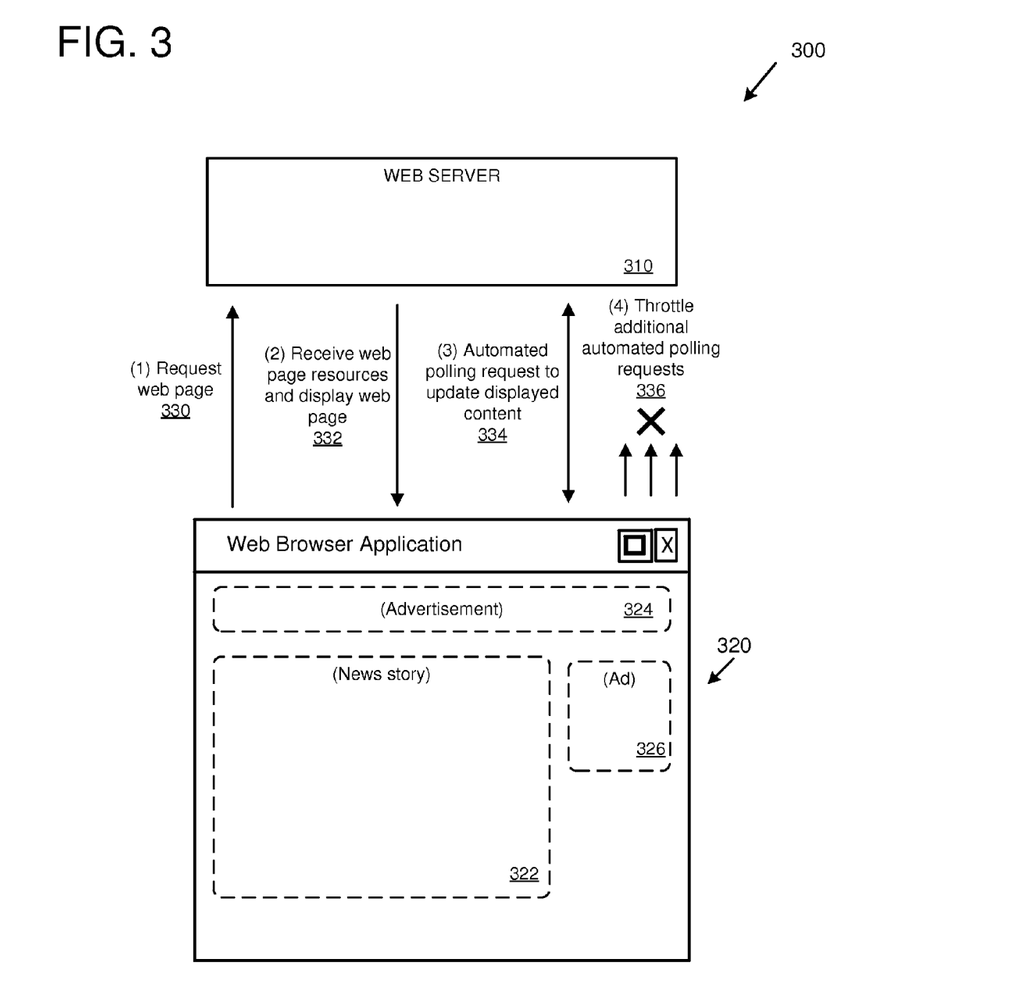
FIG. 3 is a diagram depicting an example throttling scenario.

FIG. 3 is a diagram depicting an example throttling scenario 300. In the example throttling scenario 300, a web browser application 320 (e.g., running on a client computing device) sends a request for a web page to a web server 310, as depicted at 330. In response, the web browser application 320 receives web page resources and displays the web page, as depicted at 332. In the example throttling scenario 300, the displayed web page contains a number of content areas, including a banner advertisement content area 324, a news story content area 322, and a right-side advertisement content area 326.

The web browser application 320 generates automated polling requests (e.g., via JavaScript associated with the displayed web page) to check for updated content and/or for other purposes. For example, an automated polling request to the web server 310 may be generated to check for updated news stories (to update the news story content area 322) every 5 minutes. As another example, an automated polling request to the web server 310 may be generated to check for updated advertisements (to update the banner advertisement content area 324 or right-side advertisement content area 326) every 10 minutes.

In the example throttling scenario 300, a first automated polling request during a throttling time period (e.g., a 5 minute period associated with the news story content area 322) is permitted, as depicted at 334. However, subsequent automated polling requests during the throttling time period (e.g., subsequent automated polling requests to update the same content area as the first automated polling request) are blocked, as depicted at 336. The decision to block the subsequent automated polling requests can be based on a throttling profile.

Figure 4:
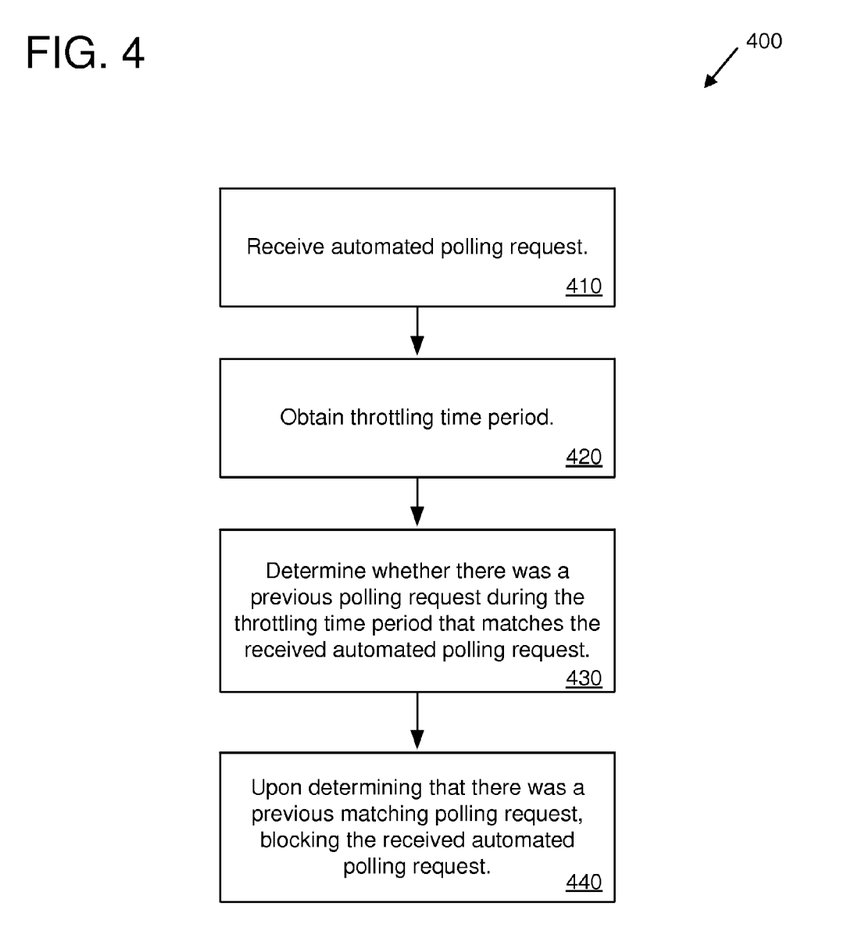
FIGS. 4, 5, and 6 are flow charts of example methods for throttling automated polling requests.

FIG. 4 is a flow chart of an example method 400 for performing automated throttling of web site polling (e.g., where throttling is performed automatically by a computing device without user interaction). For example, the example method 400 can be performed by the client device 120 described above with regard to FIG. 1 or the client device 230 described above with regard to FIG. 2.

At 410, an automated polling request is received. The automated polling request is generated by a web page running within a web browser application. The automated polling request can comprise a URL and/or other information (e.g., HTTP header field information). The automated polling request can be received by a component of the client computing device (e.g., received by a browser component, such as a plug-in, by a network layer component, by an operating system component, etc.) from the web browser application running on the client computing device.

At 420, a throttling time period is obtained. For example, the throttling time period can be obtained from a throttling policy (e.g., a throttling policy associated with the web page or the web site serving the web page).

At 430, a determination is made as to whether there was a previous automated polling request during the throttling time period that matches the received automated polling request. In order to determine whether there was a previous automated polling request, the received polling request can be compared with any previous automated polling requests generated during the throttling time period (e.g., with any previous automated polling requests that were sent, and not blocked, during the throttling time period).

Comparisons between a received automated polling request and previous automated polling requests can be made using, at least in part, URLs of the received automated polling request and the previous automated polling requests. In some implementations, an exact match of the URLs indicates a match. In some implementations, a match is made between certain portions of the URLs (e.g., only portions of the URLs that control what content is returned). For example, the URLs can be normalized and the matching can be performed by comparing the normalized URLs. A URL can be normalized by retaining certain portions of the URL (e.g., the domain name and resource path) and/or by excluding certain portions of the URL (e.g., query parameters). For example, certain portions of a URL can be removed in normalizing the URL for comparison (e.g., portions such as query parameters that may not affect the content that is returned, which can include query parameters that are used for metrics). As another example, URLs can be hashed and the hash values compared (e.g., two URLs that hash to the same value can be considered a match). Information in addition to, or instead of, the URLs can be used in the comparison. For example, various HTTP header fields can be matched (e.g., HTTP headers fields such as If-Match, If-Modified-Since, Range, and/or other HTTP header fields).

At 440, upon determining that there was a previous matching automated polling request (e.g., a previous automated polling request that was permitted) during the throttling time period, the received automated polling request is blocked. If a previous matching automated polling request is not found during the throttling time period, then the received automated polling request is not blocked (e.g., released for sending to the web server). In other implementations, the automated polling request is saved in a batch for sending later (e.g., when a WiFi network connection becomes available). For example, the automated polling request can be saved in a batch when only a cellular data connection is available, and sent later when a WiFi network connection becomes available.

In some implementations, throttling is performed in a progressive manner. For example, a first throttling time period can be a shorter time period (e.g., 1 minute) during which a predetermined number (e.g., one, two, or another number) of automated polling requests are permitted. A second throttling time period, after the first throttling time period, can be a longer time period (e.g., 5 minutes) during which a predetermined number (e.g., the same number as the first throttling time period) of automated polling requests are permitted. Additional throttling time periods can be implemented (e.g., for the same, or increasing, lengths of time). Progressive throttling can also take into account other criteria, such as network traffic (e.g., throttling of automated polling requests can be increased during periods of increased network traffic).

In some implementations, the decision of whether to permit an automated polling request takes into account the type of network connection. For example, requests that will be sent via certain types of network connections can be throttled differently than requests that will be sent via other types of network connections. As an example, automated polling requests that are using a cellular network connection can be throttled differently (e.g., throttled more) than automated polling requests that are using a WiFi network connection (e.g., requests using the WiFi network connection may be throttled less or not at all). In some implementations, more automated polling requests are permitted (e.g., by adjusting the number of automated polling requests permitted for a given throttling time period and/or by reducing the length of a given throttling time period) when a client device is using a WiFi network connection. Limiting automated polling requests that use certain types of network connections, such as cellular network connections, can reduce network usage (e.g., reducing cost) and/or reduce power usage (e.g., by reducing use of wireless radio power).

In some implementations, when an automated polling request is throttled, a response can still be provided to the web browser application. For example, the response to a previous automated polling request that was permitted can be saved (e.g., as a cached response). The previously saved response can then be provided for the throttled automated polling request.

In some implementations, automated polling requests that are throttled are saved for sending later. For example, saved automated polling requests can be grouped together (e.g., batched) and sent later when a wireless radio is turned on for another reason (e.g., to send high-priority traffic). Sending batched requests later can allow web sites to receive still receive the requests that were throttled (e.g., to generate web site statistics or for other reasons).

In some implementations, throttling is performed based on how frequently a web page changes. For example, if a page changes every minute on average (e.g., based on aggregate statistics from web page polling activity), then a number of automated polling requests (e.g., one automated polling request) can be permitted during a given one minute period. If a web page changes every hour on average, then a number of automated polling requests (one automated polling request in some implementations) can be permitted during a given one hour period.

Figure 5:
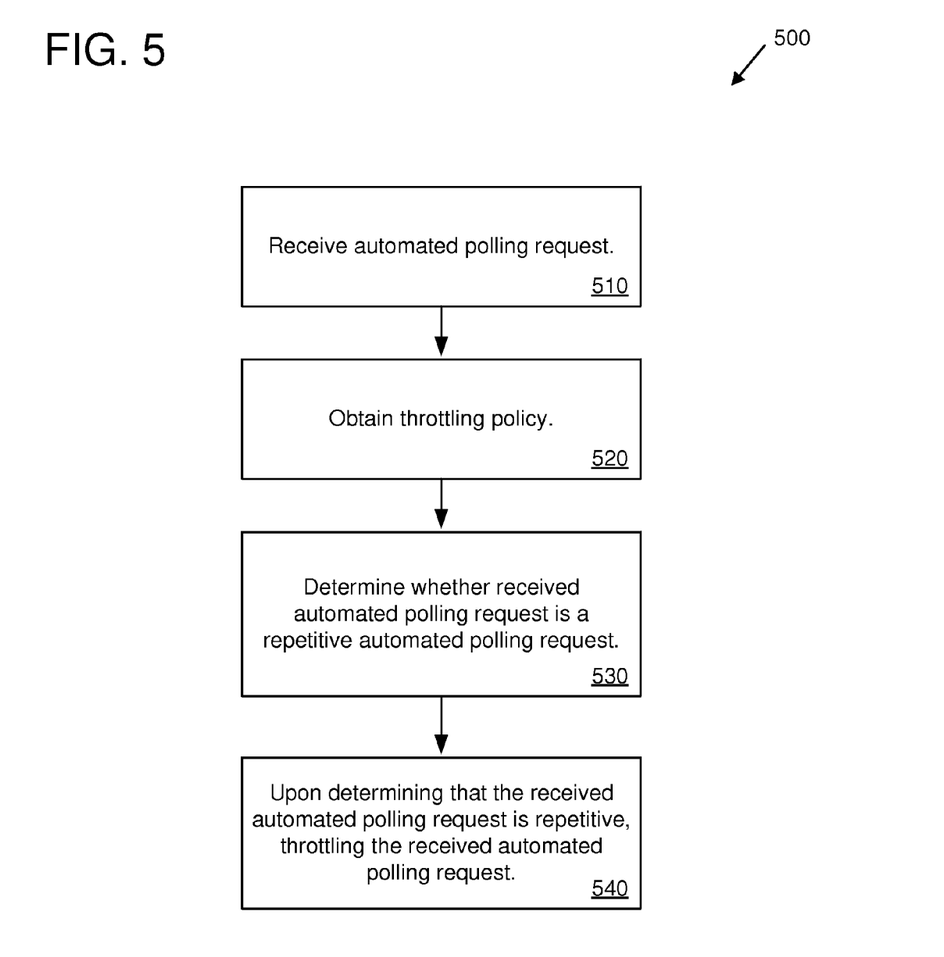

FIG. 5 is a flow chart of an example method 500 for performing automated throttling of web site polling (e.g., where throttling is performed automatically by a computing device without user interaction). For example, the example method 500 can be performed by the client device 120 described above with regard to FIG. 1 or the client device 230 described above with regard to FIG. 2.

At 510, an automated polling request is received. The automated polling request is generated by a web page running within a web browser application. The automated polling request can comprise a URL and/or other information (e.g., HTTP header field information).

At 520, a throttling policy is obtained. For example, the throttling policy can be obtained from local storage or received from a remote source (e.g., from a server participating in web browsing activity, such as the headless browser environment 210 described above with regard to FIG. 2). The throttling policy can contain information (e.g., throttling rules) controlling how throttling is performed. For example, the throttling policy can define one or more throttling time periods and rules for throttling within the throttling time periods.

At 530, a determination is made as to whether the received automated polling request is a repetitive automated polling request. For example, the received automated polling request can be considered repetitive if there is a threshold number (e.g., one, two, or another threshold number) of matching previous automated polling requests that were permitted (e.g., permitted during a current throttling time period). The determination of whether the received automated polling request is repetitive can also be based on the type of wireless network connection available to send the request. For example, if only a cellular connection is available, requests may be throttled more frequently. On the other hand, if a WiFi connection is available, more requests can be permitted and not throttled.

At 540, upon determining that the received automated polling request is repetitive, the received automated polling request is throttled. If the received automated polling request is determined to not be repetitive (e.g., the first automated polling request received during a throttling time period), the automated polling request is permitted (e.g., permitted for sending to a web site associated with the web page that generated the automated polling request). In some implementations, the throttled automated polling request is saved in a batch for sending at a later time (e.g., for sending after a current throttling time period and/or when a WiFi network connection becomes available). For example, throttled automated polling requests can be saved in a batch and sent only when a WiFi network connection becomes available (e.g., and not when a higher-cost network connect is available, such as a cellular data connection).

Figure 6:
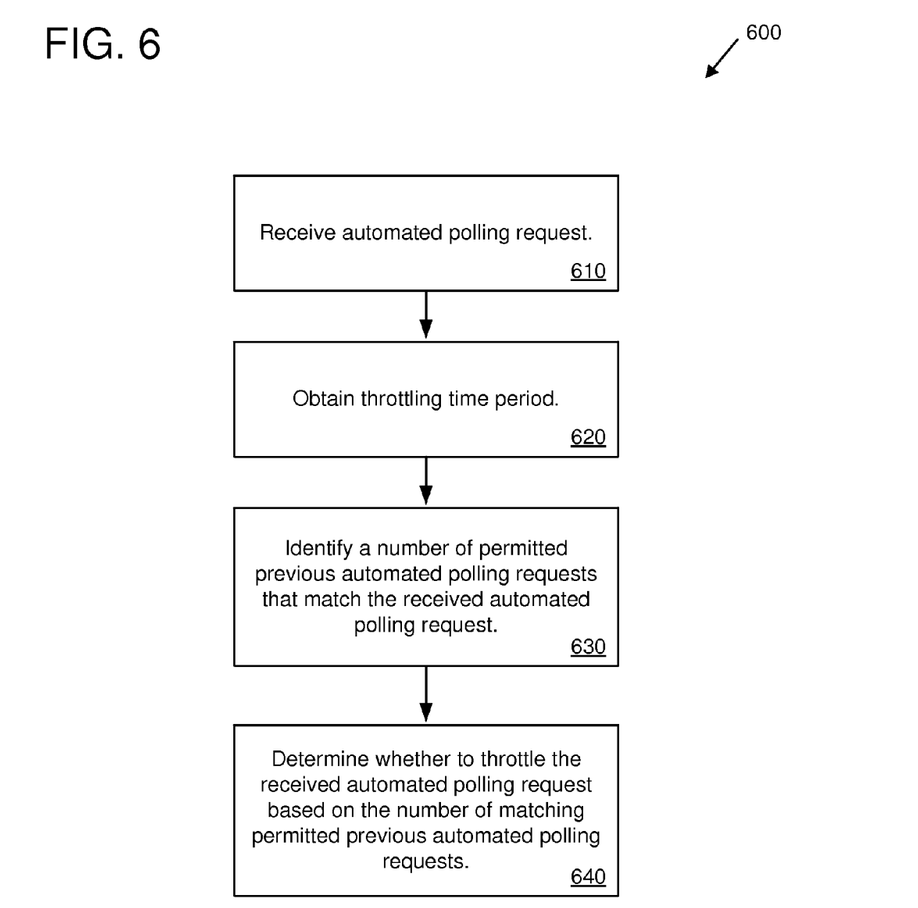

FIG. 6 is a flow chart of an example method 600 for performing automated throttling of web site polling (e.g., where throttling is performed automatically by a computing device without user interaction). For example, the example method 600 can be performed by the client device 120 described above with regard to FIG. 1 or the client device 230 described above with regard to FIG. 2.

At 610, an automated polling request is received. The automated polling request is generated by a web page running within a web browser application. The automated polling request can comprise a URL and/or other information (e.g., HTTP header field information).

At 620, a throttling time period is obtained. For example, the throttling time period can be obtained from a throttling policy (e.g., a throttling policy associated with the web page or the web site serving the web page).

At 630, a number of permitted previous automated polling requests that match the received automated polling request are identified during the throttling time period. In some implementations, matching is performed using, at least in part, URLs.

At 640, a decision is made regarding whether to throttle the received automated polling request based on the number of permitted pervious automated polling requests. In some implementations, the received automated polling request is throttled when the number of permitted previous automated polling requests that match is above a threshold value during the current throttling time period. In some implementations, the threshold value is one. In other implementations, a different threshold value is used. The threshold value can be a predefined threshold value, a value obtained from a throttling profile (e.g., a specific threshold value associated with the current web page or web site), or a user-configured threshold value.

Figure 7:
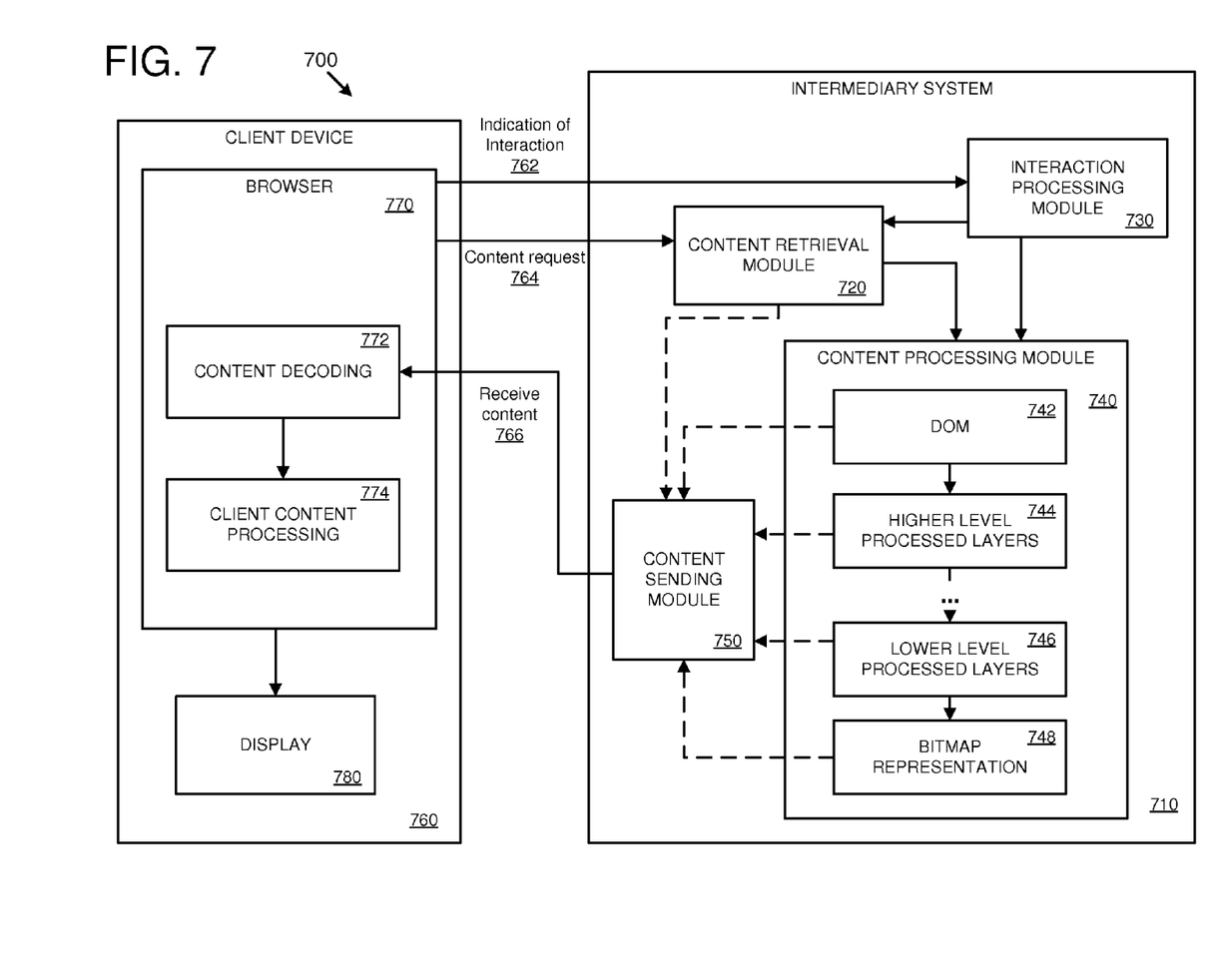
FIG. 7 is a block diagram depicting an example environment for web browsing using an intermediary system.

FIG. 7 is a block diagram depicting an example environment 700 in which content consumption activity (e.g., web browsing) is performed by a client device 760 in communication with an intermediary system 710. For example, the intermediary system 710 can be a headless browser system that performs web browsing operations independently, or in combination with, the client device 760.

The activity shown in FIG. 7 will be discussed with respect to a request for, processing of, and interaction with a content page, such as a web page. Illustratively, the content page may be any content page hosted or offered by a content source, such as a web site. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various resources including location identifiers where the resources may be obtained (e.g., local identifiers and/or external identifiers such as addresses of servers where the resources may be obtained).

As illustrated, the browser 770 of the user device 760 can send a request for content (as indicated at 764) to the content retrieval module 720 of the intermediary system 710. The request for content can be, for example, a request for a web page generated when the user selects a user-selectable option directing the browser 770 to the web page URL. The request for content may be a standardized request, such as an HTML GET request that requests a resource at a particular location. In some embodiments, the request for content may be a request for layers (e.g., for processed layers). In some embodiments, the request for content can be accompanied by data representing capabilities of client device 760, for example one or more of processing capabilities, network connection parameters, and configuration of browser 770, to name a few.

In some embodiments, when intermediary system 710 receives the request for a content page, the intermediary system 710 can assess, for the content page, whether sending the content for the page as processed layers (e.g., at one or more levels of processing) to the client device 760 will reduce a user-perceived page load time relative to at least one alternative rendering technique. In some cases, the intermediary system 710 can determine whether a layer transfer rendering technique, in which processed layers are sent, is preferable for a given page load based on a number of factors, for example the speed, bandwidth, and type of network connection of client device 760 as well as characteristics of the content site. For example, intermediary system 710 can determine or predict whether the layer transfer rendering technique will reduce a page load time and/or bandwidth consumption compared to fully rendering the content page on the browser 770 (e.g., sending original HTML and associated web resources and having the browser 770 perform all of the rendering pipeline operations) or fully rendering the content page on the intermediary system 710 (e.g., performing all of the rendering pipeline operations and sending a bitmap representation to the client device 760).

The content retrieval module 720 can retrieve the content of the content page, for example HTML and associated resources, from content sources (e.g., web servers or content servers) and/or from local storage (e.g., cache). In some implementations, the network connection between the content retrieval module 720 and the content sources may be faster than the network connection between the client device 760 and the content sources, thereby reducing latency in rendering the content page for the user. The content source may be the origin content server, a CDN server, a proxy server, or some other source.

The content processing module 740 (e.g., implementing all or part of a rendering pipeline) can receive content (e.g., web page content) from the content retrieval module 720. The content processing module 740 can construct a Document Object Model (DOM) from of the received content, as indicated at 742. For example, the DOM can be constructed by converting HTML elements and any embedded resources into DOM nodes based on a DOM definition or specification. Creating the DOM can also involve parsing any available style data, such as style data obtained from a referenced CSS file or style data included in the HTML file.

Based on the DOM, different levels of processed layers can be generated, which can include higher level processed layers 744, lower level processed layers 746 and any processed layers in-between. While two levels of processed layers are depicted (744 and 746), different implementations can have more or fewer levels of processed layers. Different layers of a content page can encompass different two-dimensional areas of the content page (for example, cover different ranges of coordinates without overlapping). In some cases, one layer may partially or completely overlap another layer (for example, a background layer may be partially overlapped by any number of other layers, each of which may partially or completely overlap other layers, etc.). The content processing module 740 can also create a bitmap representation of the content (e.g., the web page)

using the processed layers, as depicted at 748. Depending on the specific configuration being used, the content processing module 740 can create information for one or more of the levels of processing (e.g., 742, 744, 746, and/or 748). For example, the content processing module 740 may process the content to create a DOM (as depicted at 742) and a higher level processed layer (as depicted at 744) without any additional processing (e.g., without proceeding to lower level processed layers or bitmaps, as depicted at 746 and 748).

The intermediary system 710 supports sending content to the client device 760 at different levels of processing. For example, the content sending module 750 can receive raw content (e.g., original HTML content and associated resources) form the content retrieval module 720. The content sending module 750 can receive DOM information from the content processing module 740. The content sending module 750 can receive different levels of processed layers from the content processing module 740. The content sending module 750 can receive bitmap images from the content processing module 740. These different sources of content are indicated by the dashed lines within the intermediary system 710. Depending on the specific configuration being used, the content sending module 750 may receive content from one or more levels of processing (e.g., the content sending module 750 may only receive lower level processed layers for sending to the client device 760).

The content sending module 750 can encode the received content for sending to the client device 760. For example, the content sending module 750 can encode layers using a variety of layer encoding techniques and can examine the content of an individual layer to determine which encoding technique to use (e.g., to minimize bandwidth or page load time, for compatibility with a particular client device, etc.).

When the client device 760 receives the content from the content sending module 750 (as indicated at 766), the browser 770 decodes the content, as indicated at 772. Decoding the content can involve performing one or more decoding techniques corresponding to the encoding techniques used to encode the content.

The browser 770 can perform client content processing, as depicted at 774. For example, the browser 770 can perform processing operations similar to, or the same as, those performed by the content processing module 740. The type of processing performed by the browser 770 can depend on the level of processing performed by the intermediary system 710. For example, if the content processing module 740 created a DOM and then a higher level processed layer (e.g., a render layer tree) and sent the higher level processed layer to the client device 760, then the browser 770 could complete the processing by creating lower level processed layers (e.g., a graphics layer tree and a composited layer tree) and bitmaps for display, as depicted at 780 (e.g., in cooperation with a GPU of the client device 760, not depicted).

In some embodiments, the browser 770 performs content processing, as depicted at 774, to create decoded layers that can be provided to a layer compositor (not depicted) for generating instructions for display to display (as depicted at 780) a visual representation of the content page based on the layers. For example, a layer tree can be constructed so that the layers will be decoded and provided to the layer compositor in an order in which the layers should be rendered. For example, the layer compositor can assemble the decoded layers in the proper positioning and in the proper order (e.g., with a background layer behind other layers, foreground layers covering background layers with overlapping coordinates, and with an interactivity layer in front of the layers). The layer compositor can use the assembled layers to generate instructions to configure to display a visual representation of the content page.

The browser 760 can also detect user interaction with elements of the displayed content (e.g., user-selectable user-interface elements such as buttons and menus, scrolling, zooming, etc.) and send indications of user interaction to the interaction processing module 730, as indicated at 762. The browser 770 can also be configured to perform local rendering updates in some embodiments. As discussed above, a layer can be generated corresponding to a scrollable portion of the content page. Accordingly, the browser 770 can use the scrollable layer data to locally handle scrolling through the layer by updating the portion of the scrollable layer content that is displayed in the viewport, or boundary, of the scrollable layer. The browser 770 can also detect changing graphical content, for example in a GIF or video, and send a request for updated content to the intermediary system 710 if needed. In some embodiments the browser 770 may have received a URL corresponding to video content from the intermediary system 710, and accordingly may be able to handle the update to the portion of the content page including the video without sending a request to the intermediary system 710.

For any interactions that are not able to be handled locally by the browser 770 using the received content, the browser 770 can send the indications of user interaction, as depicted at 762, to the interaction processing module 730. The interaction processing module 730 can determine whether any updates to the visual representation of the content page are necessitated by the user interaction with the elements of the content. For example, the interaction processing module 730 can communicate with the content retrieval module 720 to obtain new or update content. The interaction processing module 730 can also communicate with the content processing module 740 to perform processing of content (e.g., an update to the DOM, an update to one or more processing layers, etc.) for sending back to the client device 760 in response to the interaction.

In some implementations, the intermediary system 710 supports throttling of automated polling requests. For example, the intermediary system 710 can monitor web site activity and store aggregated statistics regarding polling activity (e.g., how frequently web pages requested by client devices perform polling activity, polling URLs used, etc.). The intermediary system 710 can create and store throttling profiles (e.g., on a per-web-page and/or per-web-site basis) based on the monitored activity. The intermediary system 710 can send throttling profiles to client devices, such as client device 760, for use in throttling automated polling request by the client devices.

Figure 8:
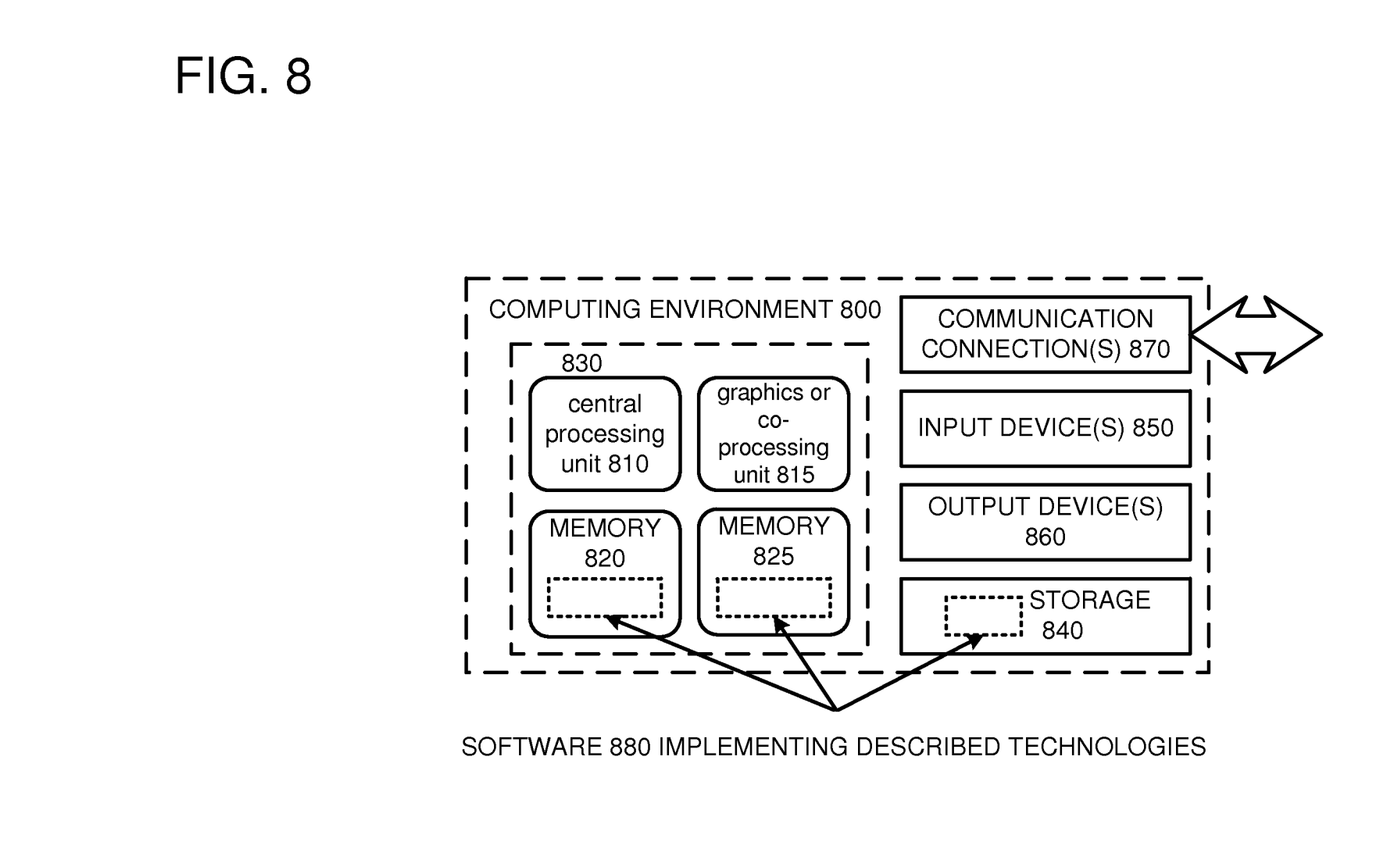
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a touch display or touchpad, a keyboard, a mouse, a pen, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a client computing device, for automatic throttling of web site polling, the method comprising:
   receiving, by a component of the client computing device, an automated polling request comprising a uniform resource locator (URL) that is generated by a web page running within a web browser of the client computing device, wherein the automated polling request polls a remote web site for web content;
   obtaining, by the client computing device, a throttling time period;
   determining, by the client computing device, whether there was a previous automated polling request during the throttling time period that matches the received automated polling request, wherein the determining comprises:
      comparing the received automated polling request to previous automated polling requests that occurred during the throttling time period, wherein the comparing is performed, at least in part, using URLs; and
   upon determining that there was a previous automated polling request during the throttling time period that matches the received automated polling request, blocking, by the client computing device, the received automated polling request.

2. The method of claim 1 wherein comparing the received automated polling request to previous automated polling requests comprises:
   comparing at least a portion of the URL of the received automated polling request to at least portions of URLs of the previous automated polling requests using one or more of hashed URL values and normalized URLs.

3. The method of claim 1 wherein the method limits automated polling requests to one per throttling time period, the method further comprising:
   obtaining a second throttling time period longer than the throttling time period; and
   permitting one additional automated polling request during the second throttling time period.

4. The method of claim 1 further comprising;
   determining that the received request is a non-user-initiated request.

5. The method of claim 1 wherein the automated polling request comprising the URL is received from an automated web page process that generates the automated polling request on a periodic basis to poll the remote web site for web content.

6. The method of claim 5 wherein the automated polling request is received by one of a web browser plug-in and a networking component.

7. The method of claim 1 further comprising:
   upon determining that there was not a previous automated polling request during the throttling time period that matches the automated polling request, permitting the received automated polling request.

8. A computing device comprising:
   one or more processing units; and
   one or more network interfaces;
   the computing device configured to perform operations for automatic throttling of web site polling, the operations comprising:
      receiving, by the computing device, an automated polling request generated by a web page within a web browser running on the computing device;
      obtaining, by the computing device, a throttling policy;
      determining, by the computing device, whether the received automated polling request is a repetitive automated polling request based on the throttling policy; and
      upon determining that the received automated polling request is a repetitive automated polling request, throttling, by the computing device, the received automated polling request.

9. The computing device of claim 8 wherein determining whether the received automated polling request is a repetitive automated polling request comprises:
   identifying a throttling time period defined by the throttling policy; and
   determining that the received automated polling request is a repetitive automated polling request when a matching previous automated request is present during the throttling time period.

10. The computing device of claim 9 wherein determining whether a previous automated polling request matches the received automated polling request comprises:
    normalizing the received automated polling request; and
    comparing the normalized received automated polling request to normalized previous automated polling requests.

11. The computing device of claim 9 wherein determining whether a previous automated polling request matches the received automated polling request comprises:
    hashing the received automated polling request to create a hash value; and
    comparing the hash value to hash values of previous automated polling requests.

12. The computing device of claim 8 wherein determining whether the received automated polling request is a repetitive automated polling request comprises:
    identifying a number of pervious automated polling requests that match the automated polling request, wherein the matching is performed, at least in part, based on comparison of URLs; and
    determining whether the number of previous automated polling requests is above a threshold value defined by the throttling policy.

13. The computing device of claim 8 the operations further comprising, upon determining that the received automated polling request is a repetitive automated polling request:
    obtaining a cached response from a matching previous automated polling request; and
    providing the cached response to the web page running within the web browser.

14. The computing device of claim 8 the operations further comprising, upon determining that the received automated polling request is a repetitive automated polling request:
- saving the received automated polling request in a batch with other throttled automated polling requests; and
- at a later time, sending the batch of throttled automated polling requests.

15. The computing device of claim 8 further comprising:
- sending a request for the web page to a headless browser environment; and
- in response to sending the request, receiving the requested web page and the throttling policy from the headless browser environment;
- wherein the received automated polling request is generated on a periodic basis to poll a web site for web content, and wherein the throttling policy is specific to the web site.

16. The computing device of claim 8 wherein the throttling policy comprises:
- one or more throttling rules that apply to a cellular network connection;
- one or more other throttling rules that apply to a WiFi network connection; and
- one or more rules that define one or more Internet Protocol (IP) ranges to which the throttling policy applies.

17. The computing device of claim 8 wherein determining whether the received automated polling request is a repetitive automated polling request comprises:
- determining whether a WiFi wireless network connection is available for sending the received automated polling request; and
- when a WiFi wireless network connection is available:
  - determining that the received automated polling request is not repetitive; and
  - permitting the received automated polling request to be sent via the WiFi wireless network connection.

18. A non-transitory computer-readable storage medium storing computer-executable instructions for causing a computing device to perform operations for automatic throttling of web site polling, the operations comprising:
- receiving, by the computing device, an automated polling request comprising a uniform resource locator (URL) that is generated by a web page within a web browser running on the computing device;
- obtain, by the computing device, a throttling time period;
- identifying, by the computing device, a number of previous automated polling requests that were permitted during the throttling time period and that match the received automated polling request;
- based on the number of matching previous automated polling requests during the throttling time period, determining, by the computing device, whether to throttle the received automated polling request; and
- when the number of matching previous automated polling requests during the throttling time period is above a threshold value, throttling the received automated polling request.

19. The computer-readable storage medium of claim 18 wherein identifying the number of previous automated polling requests that were permitted during the throttling time period and that match the received automated polling request comprises:
- comparing, at least in part, URLs of the received automated polling request and any previous automated polling requests that were permitted during the throttling time period.

* * * * *